United States Patent [19]

Fendley

[11] E Patent Number: Re. 33,698

[45] Reissued Date of Patent: Sep. 24, 1991

[54] COLOR CATHODE RAY TUBE HAVING A FACEPLATE-MOUNTED SUPPORT STRUCTURE WITH A WELDED-ON HIGH-TENSION FOIL SHADOW MASK

[75] Inventor: James R. Fendley, Arlington Heights, Ill.

[73] Assignee: Zenith Electronics Corporation, Glenview, Ill.

[21] Appl. No.: 421,909

[22] Filed: Oct. 16, 1989

Related U.S. Patent Documents

Reissue of:

[64] Patent No.: 4,730,143
Issued: Mar. 8, 1988
Appl. No.: 832,493
Filed: Feb. 21, 1986

[51] Int. Cl.[5] ..... H01J 29/07

[52] U.S. Cl. ..... 313/407; 313/402

[58] Field of Search ..... 313/402, 407, 408; 427/68, 72, 73

[56] References Cited

U.S. PATENT DOCUMENTS

| | | | |
|---|---|---|---|
| 2,625,717 | 1/1953 | Wampler et al. | 20/56.5 |
| 3,284,655 | 11/1966 | Oess | 313/286 |
| 3,638,063 | 1/1972 | Techikawa et al. | 313/348 |
| 3,727,087 | 4/1973 | Steinberg et al. | 313/91 |
| 3,894,321 | 7/1975 | Moore | 29/25.15 |
| 4,045,701 | 8/1977 | Dougherty | 313/408 |
| 4,069,567 | 1/1978 | Schwartz | 29/25.15 |
| 4,087,717 | 5/1978 | Lerner | 313/406 |
| 4,100,451 | 7/1978 | Palac | 313/404 |
| 4,540,599 | 9/1985 | Rabatin | 427/73 X |
| 4,547,696 | 10/1985 | Strauss | 313/407 |
| 4,739,217 | 4/1988 | Fendley et al. | 313/407 |
| 4,849,671 | 7/1989 | Fendley | 313/407 |

FOREIGN PATENT DOCUMENTS

| | | | |
|---|---|---|---|
| 22758 | 2/1979 | Japan | 313/402 |

OTHER PUBLICATIONS

"The CBS Colortron: a Color Picture Tube of Advanced Design," Fyler et al., Proc. of the IRE, Jan. 1954, pp. 326–334.

"A High-Brightness Shadow-Mask Color CRT for Cockpit Displays", Robinder et al., SID 83 Digest, 12/1983, pp. 72 & 73.

*Primary Examiner*—Kenneth Wieder

[57] ABSTRACT

An improved front assembly for a color cathode ray tube having a tension foil shadow mask is disclosed. The faceplate of the tube has on its inner surface a centrally disposed phosphor target surrounded by a peripheral sealing area adapted to mate with a funnel. A separate metal faceplate frame is secured to the inner surface of the faceplate between the sealing area and the target. The separate metal frame according to the invention supports a welded-on tension foil shadow mask a predetermined distance from the inner surface of the faceplate. The separate faceplate-mounted metal frame may have according to the invention a plurality of slurry-passing structures contiguous to the inner surface of the faceplate for passing any surplusage of slurry during the radial-flow slurry-deposition process used in screening the faceplate. Various configurative embodiments of the faceplate-mounted metal frame according to the invention are also disclosed.

26 Claims, 5 Drawing Sheets

COLOR CATHODE RAY TUBE HAVING A FACEPLATE-MOUNTED SUPPORT STRUCTURE WITH A WELDED-ON HIGH-TENSION FOIL SHADOW MASK

Matter enclosed in heavy brackets [ ] appears in the original patent but forms no part of this reissue specification; matter printed in italics indicates the additions made by reissue.

CROSS-REFERENCE TO RELATED APPLICATIONS AND PATENTS

This application is related to but in no way dependent upon copending applications Ser. No. 538,001 filed Sept. 30, 1983; now U.S. Pat. No. 4,593,224; Ser. No. 538,003, filed Sept. 30, 1983; Serial No. 572,088, filed Jan. 18, 1984, now U.S. Pat. No. 4,547,696; Ser. No. 572,089, filed Jan. 18, 1984 now U.S. Pat. No. 4,596,847; Ser. No. 725,040, filed Apr. 19, 1985; Ser. No. 729,015; filed May 17, 1985; Ser. No. 758,174, filed July 23, 1985; Ser. No. 832,559, filed Feb. 21, 1986; Ser. No. 635,845 filed Mar. 3, 1986 and Ser. No. 831,696, filed Feb. 21, 1986, all of common ownership herewith.

BACKGROUND OF THE INVENTION

This invention relates to color cathode ray picture tubes and is addressed spcifically to a novel front assembly for color tubes that have a tension foil shadow mask. The invention is useful in color tubes of various types including those used in home entertainment television receivers, and those used in medium-resolution and high-resolution tubes intended for color monitors.

The use of the tension foil mask and flat faceplate provides many advantages and benefits in comparison with the conventional domed shadow mask. Chief among these is a greater power-handling capability which makes possible as much as a three-fold increase in brightness. The conventional curved shadow mask, which is not under tension, tends to "dome" in high-brightness picture areas where the intensity of electron bombardment is greatest. Color impurities result as the mask moves closer to the faceplate. Being under high tension, the tension foil mask does not dome or otherwise move in relation to the faceplate, hence its greater brightness potential while maintaining color purity.

The tension foil shadow mask is a part of the cathode ray tube front assembly, and is located in close adjacency to the faceplate. The front assembly comprises the faceplate with its deposits of light-emitting phosphors, a shadow mask, and support means for the mask. As used herein, the term "shadow mask" means an apertured metallic foil which may have a thickness, by way of example, of about one mil or less. The mask must be supported in high tension a predetermined distance from the inner surface of the cathode ray tube faceplate; this distance is known as the "Q-distance". The high tension may be in the range of 20 to 40 kpsi. As is well known in the art, the shadow mask acts as a color-selection electrode, or parallax barrier, which ensures that each of the three beams lands only on its assigned phosphor deposits.

The requirements for the support means for the shadow mask are stringent. As has been noted, the shadow mask must be mounted under high tension. The mask support means must be of high strength so that the mask is held immovable—an inward movement of the mask of as little as one-tenth of a mil is significant in that guard band may be expended. Also, the shadow mask support means must be of such configuration and material composition as to be compatible with the means to which it is attached. As an example, if the support means is attached to glass such as the inner surface of the faceplate, the support means must have about the same thermal coefficient of expansion as that of the glass. The support means must provide a suitable surface for mounting the mask. Also, the support means must be of a composition such that the mask can be welded onto it by electrical resistance welding or by laser welding. The support surface is preferably of such flatness that no voids can exist between the metal of the mask and the support structure to prevent the intimate metal-to-metal contact required for proper welding.

A tension mask registration and supporting system is disclosed by Strauss in U.S. Pat. No. 4,547,696 of common ownership herewith. A frame dimensioned to enclose the screen comprises first and second space-apart surfaces. A tensioned foil shadow mask has a peripheral portion bonded to a second surface of the frame. The frame is registered with the faceplate by ball-and-groove indexing means. The shadow mask is sandwiched between the frame and a stabilizing or stiffening member. When the system is assembled, the frame is located between the sealing lands of the faceplate and a funnel, with the stiffening member projecting from the frame into the funnel. While the system is feasible and provides an effective means for holding a mask under high tension and rigidly planoparallel with a flat faceplate, weight is added to the cathode ray tube, and additional process steps are required in manufacture.

There exists in the marketplace today a color tube that utilizes a tensed shadow mask. The mask is understood to be placed under high tension by purely mechanical means. Specifically, a very heavy mask support frame is compressed prior to and during affixation oif the mask to it. Upon release of the frame, restorative forces in the frame cause the mask to be placed under high residual tension. During normal tube operation, electron beam bombardment causes the mask to heat up and the mask tension to be reduced. An upper limit is placed on the intensity of the electron beams that may be used to bombard the screen without causing the mask to relax completely and lose its color selection capability. The upper limit has been found to be below that required to produce color pictures of the same brightness as are produced in tubes having non-tensed shadow masks. For descriptions of examples of this type of tube, see U.S. Pat. No. 3,683,063 to Tachikawa.

A color cathode ray tube includes three electron guns arranged in a delta- or an in-line configuration. Each gun project an electron beam through the apertures of a mask onto assigned target areas located on the inner surface of the faceplate. The target areas comprises a pattern of phosphor deposits typically arranged in triads of dots or lines. Each of the triads consists of a deposit of a red-light-emitting, green-light-emitting, and a blue-light-emitting phosphor. To increase the apparent brightness of the display, and to minimize the incidence of color impurities that can result if a beam falls upon an unassigned phosphor deposit, the target area may include a layer of darkish light-absorbing material termed a "grille" that surrounds and separates each of the dots or lines, and which serves as a "guard band" in case of beam misregistration.

The phosphor deposits are typically formed by a photoprinting process. The grille, which is also termed the "black surround," is applied first. The target area is then coated with a photosensitive slurry comprising phosphor particles of one of the three phosphors described. The shadow mask, mounted on a rigid frame, is temporarily installed in precise relationship to the faceplate, and the coating is exposed to light actinic to the phosphor deposits projected through the apertures of the mask from a light source located at a position that corresponds to the beam-emission point of the associated electron gun of the end-product tube. The faceplate is then separated from the shadow mask and the coating is "developed." The final result is a pattern of dots or lines capable of emitting, upon beam excitation, red, green or blue light. The photoscreening steps are repeated for each of the remaining colors to deposit triads of phosphor deposits on the target area in coordinate relationship with each aperture of the mask.

In the faceplate screening process, the phosphors for each color are typically embodied in a process screening fluid commonly referred to as a "slurry." The slurry is typically applied to the faceplate by a process known as "radial flow suffusion." The screening fluid is poured onto the faceplate while the faceplate is rotating. As the faceplate turns, the fluid spreads to the edges of the panel and excess fluid is cast off by centrifugal force. If there is any impediment to the free flow of the slurry during the screening process, the radially out-rushing slurry will "wash back," resulting in wave patterns in the coating which will become fixed following the drying of the slurry as by air and applied heat. The effect of this non-uniformity in phosphor density can become cumulative as the faceplate is successively screened. The deleterious effects of the wave patterns are threefold. First, the thickened coatings are visible to the viewer as dark areas on the screen; second, cross-contamination of the colors can occur; and third, underexposure in the thickened areas during the photoprinting process results in non-adherence of the phosphor and consequent phosphor wash-off and flake-off.

U.S. Pat. No. 3,894,321 to Moore, of common ownership herewith, is directed to a method for processing a color cathode ray tube having a thin foil mask sealed in tension directly to the bulb. Included in this disclosure is a description of the sealing of a foil mask between the junction of the skirt of the faceplate and the funnel. The mask is shown as having two or more alignment holes near the corners of the mask which mate with alignment nipples in the faceplate. The nipples pass through the alignment holes to fit into recesses in the funnel. In another Moore embodiment, the front panel is shown as having a continuous ledge around the inner surface of the faceplate. The top surface of the ledge is spaced a Q-distance away from the faceplate for receiving a foil mask such that the mask is sealed within the tube envelope. In yet another embodiment, there are two ledges located at the sides of the faceplate parallel with the vertical axis of the faceplate for receiving a shadow mask. Also shown in an embodiment in which the faceplate is skirtless and essentially flat.

Other prior are: Lerner—U.S. Pat. No. 4,087,717; Dougherty—U.S. Pat. No. 4,045,701; Palac—U.S. Pat. No. 4,100,451; Law—U.S. Pat. No. 2,625,734; Steinberg et al—U.S. Pat. No. 3,727,087; Schwartz—U.S. Pat. No. 4,069,567; Oess—U.S. Pat. No. 3,284,655; Hackett—U.S. Pat. No. 3,303,536; Vincent—U.S. Pat. No. 2,905,845; Fischer-Colbrie—U.S. Pat. No. 2,842,696; a journal article; "The CBS Colortron: A color picture tube of advanced design." Fyler et al. Proc. of the IRE, Jan. 1954. Dec. class R583.6; and a digest article: "A High-Brightness Shadow-Mask Color CRT for Cockpit Displays." Robinder et al. Society for Information Display, 1983.

OBJECTS OF THE INVENTION

It is a general object of the invention to provide enhanced performance in high-resolution and home-entertainment-type color cathode ray tubes that utilize a tension foil shadow mask.

It is another general object of the invention to provide an improved front assembly for tension foil shadow mask tubes.

It is another object of the invention to provide an improved front assembly for a cathode ray tubes comprising a separate faceplate-mounted metal frame with a welded-on tension foil shadow mask.

It is a further object of the invention to provide means for facilitating the disposition of phosphors on the faceplate of tubes having an improved front assembly according to the invention comprising a separate faceplate-mounted metal frame for supporting a welded-on tension foil shadow mask.

BRIEF DESCRIPTION OF THE DRAWINGS

The features of the present invention which are believed to be novel are set forth with particularity in the appended claims. The invention, together with further objects and advantages thereof, may best be understood by reference to the following description taken in conjunction with the accompanying drawings, in the figures of which like reference numerals identify like elements, and in which:

DESCRIPTION OF THE PREFERRED EMBODIMENT

Figure 1:
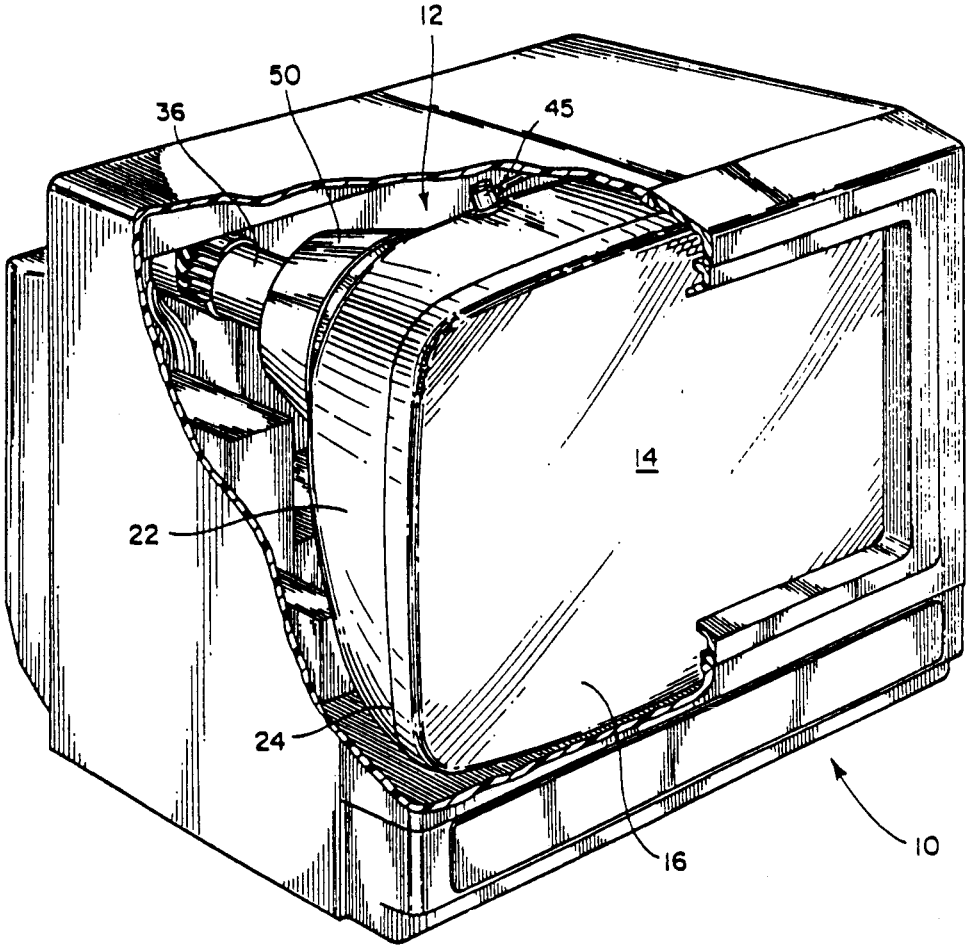
FIG. 1 is a cut-away view in perspective of a cabinet that houses a cathode ray tube having a novel front assembly according to the invention; the figure shows major components which are the subject of the invention.

FIG. 1 depicts a video monitor 10 that houses a color cathode ray tube 12 having a novel front assembly according to the invention. The design of the video monitor is the subject of copending design patent application Ser. No. 725,040 of common ownership herewith. The monitor-associated tube is notable for the flat imaging area 14 that makes possible the display of images in undistorted form. Imaging area 14 also offers a more efficient use of screen area as the corners are relatively square in comparison with the more rounded corners of the conventional cathode ray tube. The front assembly according to the invention comprises the components described in the following paragraphs.

Figure 2:
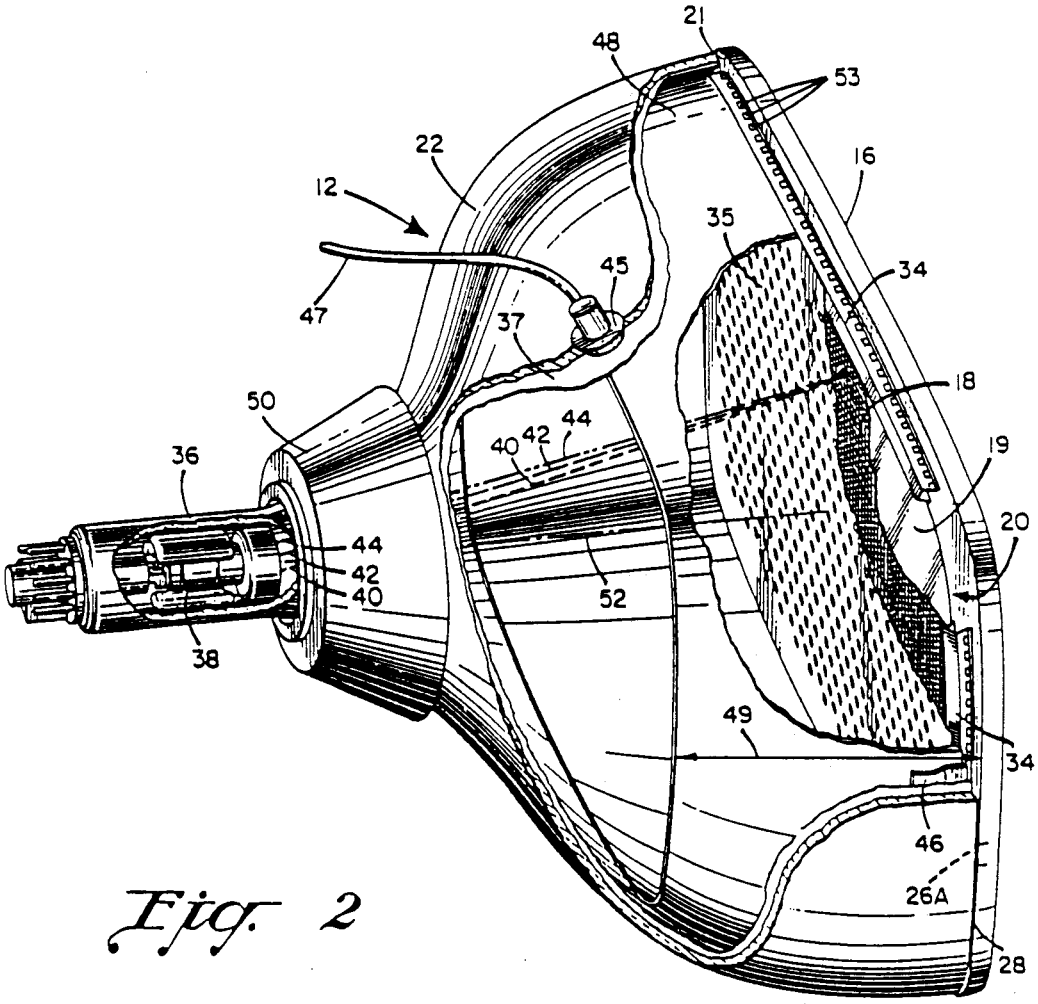
FIG. 2 is a side view in perspective of the color cathode ray tube of FIG. 1 showing another view of components depicted in FIG. 1 together with cut-away sections that show features of the novel front assembly according to the invention that includes a spearate faceplate-mounted metal frame with a welded-on tension foil shadow mask.
Figure 3:
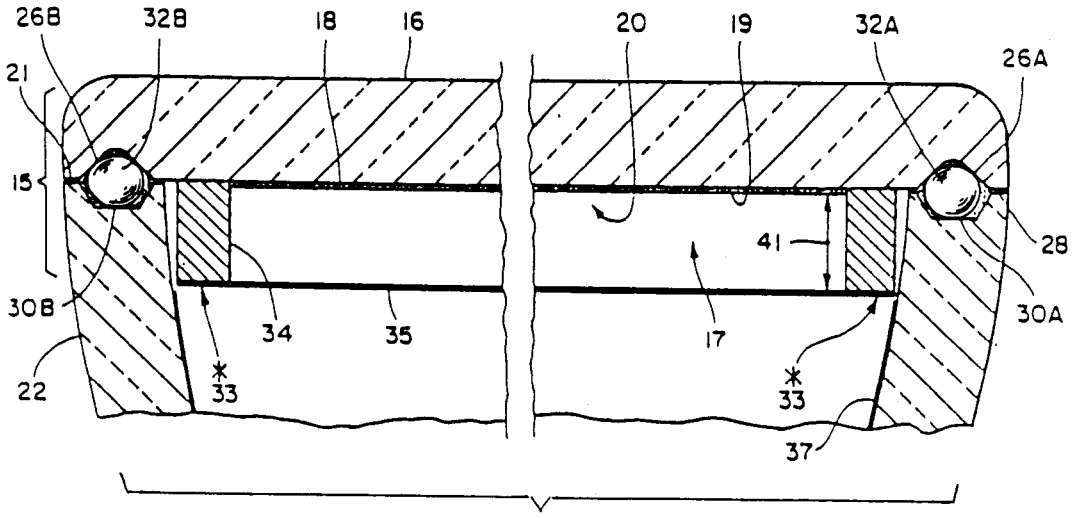
FIG. 3 is a view in elevation of a conjoined faceplate and a funnel sectioned at a 120-degree azimuthal interval, and showing in greater detail the separate faceplate-mounted metal frame with a welded-on tension foil shadow mask according to the invention.
Figure 4:
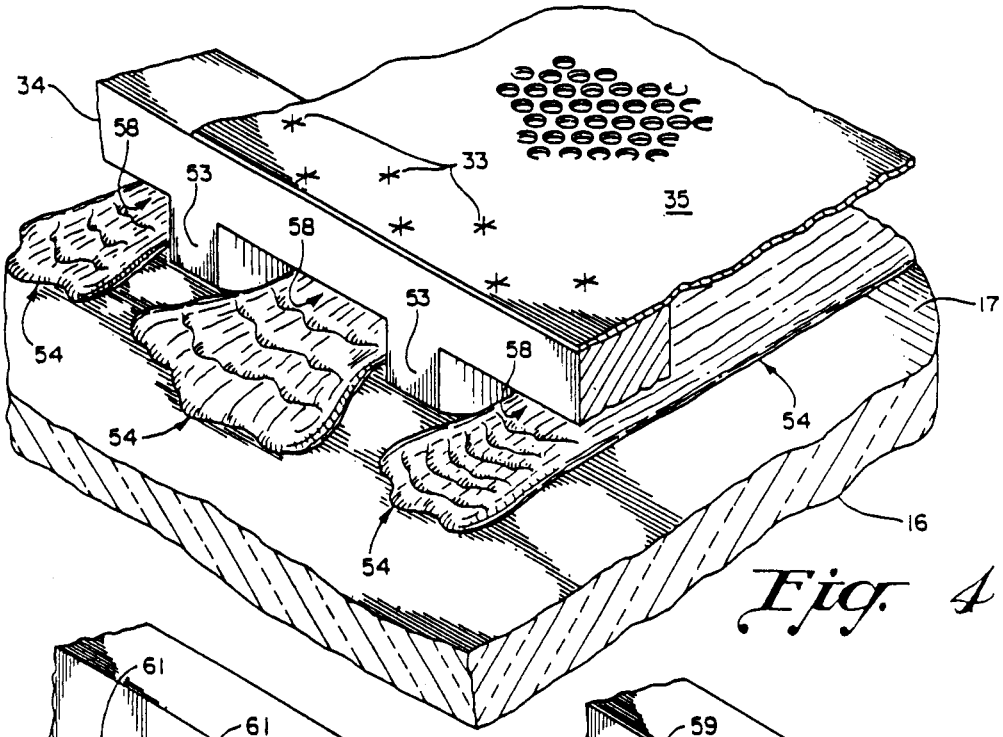
FIG. 4 is an oblique view in perspective of a section of the front assembly and its construction according to the invention, and indicating slurry flow through another embodiment of the separate faceplate-mounted metal frame according to the invention during the radial flow suffusion screening process.

With reference also to FIGS. 2, 3 and 4, a front assembly 15 for a high-resolution color cathode ray tube is depicted, the general scope of which is indicated by the bracket. The front assembly 15 includes a glass faceplate 16 noted as being flat, or alternately, "substantially" flat in that it may have finite horizontal vertical radii. Faceplate 16, depicted in this embodiment of the invention as being planar and flangeless, is represented as having on its inner surface 17 a centrally disposed phosphor target 18, on which is deposited an electrically conductive film 19. The phosphor target area 18 and the conductive film 19 comprises the electron beam target area, commonly termed a "screen" 20 which serves, during manufacture, for receiving a uniform coat of phosphor slurry. The conductive film 19, which is deposited on the phosphor deposits in a final step, typically consists of a very thin, light-reflective, electron-pervious film of aluminum.

Screen 20 is surrounded by a peripheral sealing area 21 adapted to be mated with a funnel 22. Sealing area 21 is represented as having three substantially radially oriented first indexing V-grooved grooves 26A, 26B, and 26C therein. The indexing grooves are preferably peripherally located at equal angular intervals about the center of the faceplate 16; that is, at 120-degree intervals. Indexing grooves 26A and 26B, also preferably located 120 degrees apart, are shown by FIG. 3. The third indexing element is not shown; however, as noted, it is also located in perpheral sealing area 21 equidistantly from indexing elements 26A and 26B. The V-shaped indexing grooves provide for indexing faceplate 16 in conjunction with a mating envelope member, as will be shown.

Funnel 22 has a funnel sealing area 28 with second indexing elements 30A and 30B therein in like orientation, and depicted in FIG. 3 in facing adjacency with the first indexing elements 26A and 26B. Ball means 32A and 32B, which provide complementary rounded indexing means, are conjugate with the indexing elements 26A and 26B and 30A and 30B for registering the faceplate 16 and the funnel 22. The first indexing elements together with the ball means, are also utilized as indexing means during the photoscreening of the phosphor deposits on the faceplate.

Front assembly 15 according to the invention includes a separate faceplate-mounted metal frame 34 secured to the inner surface of faceplate 16 between the screen 20 and the peripheral sealing area 21 of faceplate 16, and enclosing the phosphor target 18. The separate faceplate-mounted metal frame 34 according to the invention provides for supporting a welded-on tension foil shadow mask 35 a predetermined "Q" distance from the inner surface of faceplate 16. The mask, indicated as being planar, is depicted as being stretched in all directions in the plane of the mask. The welding, indicated by the associated weldment symbols 33, may be spot-welding. The predetermined distance may comprise the "Q-distance" 41, as indicated by the associated arrow in FIG. 3. The metal faceplate frame 34 according to the invention may for example be attached to the inner surface of the faceplate by a devitrifying glas frit well-known in the art, or by a cold-setting cement such as a Saucreisen-type cement.

A neck 36 extending from funnel 22 is represented as housing an electron gun 38 which is indicated as emitting three electron beams 40, 42 and 44 that selectively activate phosphor target 18, noted as comprising colored-light emitting phosphor deposits overlayed with a conductive film 19. Beams 40, 42 and 44 serve to selectively activate the pattern of phosphor deposits after passing through parallel barrier formed by shadow mask 35.

Funnel 22 is indicated as having an internal electrically conductive funnel coating 37 adapted to receive a high electrical potential. The potential is depicted as being applied through an anode button 45 attached to a conductor 47 which conducts a high electrical potential to the anode button 45 through the wall of the funnel 22. The source of the potential is a high-voltage power supply (not shown). The potential may be for example in the range of 18 to 26 kilovolts in the illustrated monitor application. Means for providing an electrical connection between the electrically conductive metal faceplate frame 34 and the funnel coating 37 may comprise spring means 46 (depicted in FIG. 2).

A magnetically permeable internal magnetic shield 48 is shown as being attached to faceplate-mounted metal frame 34. Shield 48 extends into funnel 22 a predetermined distance 49 which is calculated so that there is no interference with the excursion of the electron beams 40, 42 and 44, yet maximum shield is provided.

A yoke 50 is shown as encircling tube 12 in the region of the junction between funnel 22 and neck 36. Yoke 50 provides for the electromagnetic scanning of beams 40, 42 and 44 across the screen 20. The center axis 52 of tube 12 is indicated by the broken line.

Figure 4A:
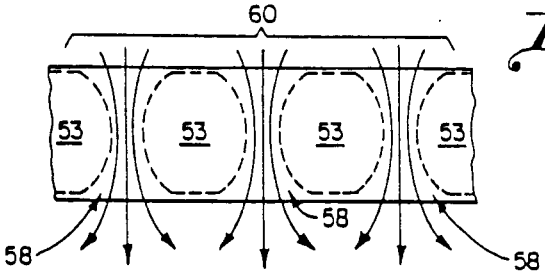
FIG. 4A is a top view of the section shown in FIG. 4 depicting the slurry-passing structures in greater detail.

The separate faceplate-mounted metal frame according to the inbention may be continuous (unborken); however, for ease of slurry screening in certain types of screening equipment, it may according to the invention have slurry-passing structures contiguous to the inner surface of the faceplate 16 for passing radially outwardly any surplusage of slurry during the photodeposition process. Configurative aspects of such slurry-passing structures are shown in greater detail in FIGS. 4 and 4A, and in FIGS. 5A and 5B. In FIG. 4, a section of metal faceplate frame 34 is shown in detail as having slurry-passing structurs 53 which are contiguous to the inner surface 17 of the faceplate 16. As shown by FIG. 4, and in the top view FIG. 4A, the slurry passing structures 53 are depicted as comprising columns affixed to the inner surface 17 of faceplate 16, and having openings 58 therebetween. The columns will be seen to have, in the illustrated preferred embodiment, a cross-section effective to promote radial flow of the slurry 54 with minimum washback.

Figure 5B:
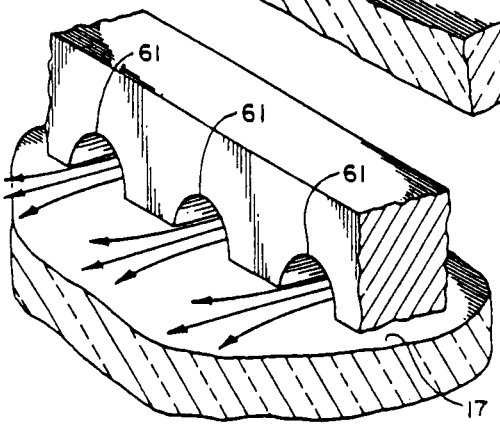
FIGS. 5A and 5B are views in perspective showing alternate novel slurry-passing structures according to the invention that facilitate the radial flow suffusion screening process.
Figure 5A:
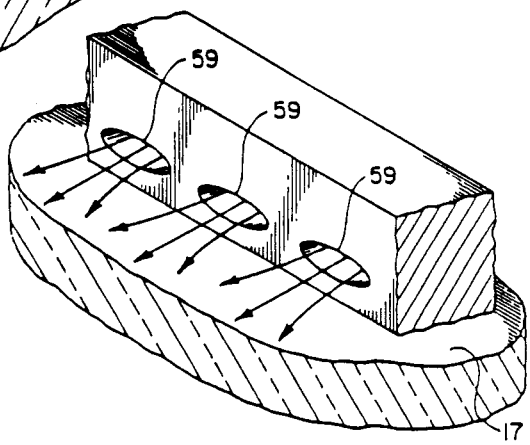

Other aspects of slurry-passing structure configurations according to the invention are portrayed in FIGS. 5A and 5B. In FIG. 5A, slurry-passing apertures 59 are depicted as being a series of ovals contiguous to but not opening onto the inner surface 17 of the underlying faceplate 16; the associated arrow indicate the flow of the slurry. In FIG. 5B, the slurry-passing apertures 61 are depicted as comprising a series of tunnels contiguous with the inner surface 17 of faceplate 16; the associated arrows indicate the flow of slurry. Other feasible slurry-passing aperture configurations will readily recommend themselves to those skilled in the art, with all such innovations being within the spirit and scope of the invention.

Figure 6:
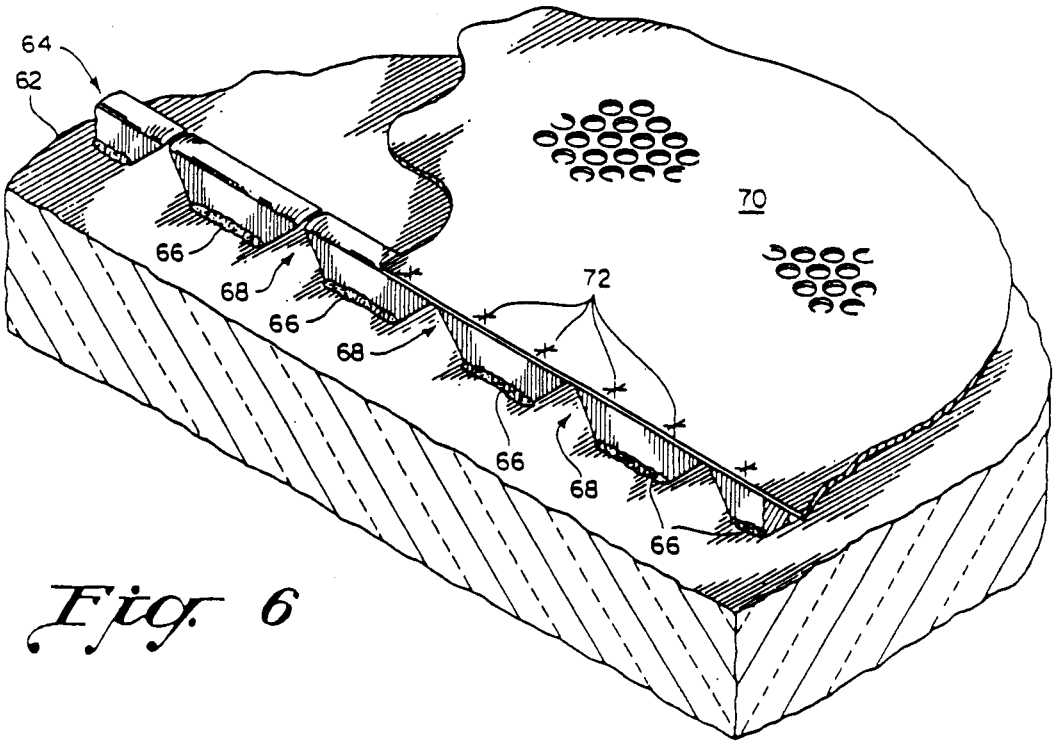
FIG. 6 is a sectional view in perspective showing an another embodiment of the separate faceplate-mounted metal frame according to the invention as secured to a faceplate, and with a welded-on shadow mask according to the invention.

The separate faceplate-mounted metal frame that supports a welded-on tension foil shadow mask according to the invention may comprise a continuous ring of metal, as indicated by faceplate frame 34 in FIG. 2. The faceplate-mounted metal frame according to the invention can as well be discontinuous ("broken") or segmented, as indicated by the metal faceplate frame 64 depicted in FIG. 6. It is observed that frame 64 is "discontinuous" only in the sense that it is segmented; the sequence of the segments however is continuous along the sides of the mask. Frame 64 is shown as being attached by cement 66 to a faceplate 62; means of attachment may comprise, for example, a devitrifying glass frit or a cold-setting cement such as a Sauereisen-type cement. Metal faceplate frame 64, noted as being discontinuous, will be seen as having gaps 68 which can act as slurry-passing apertures. A further advantage in providing a discontinuous faceplate-mounted metal frame lies in the fact that a problem may be experienced in securing a separate faceplate-mounted metal frame (the faceplate frame according to the invention) to a glass faceplate unless the two have near-exact thermal coefficients of expansion. Even a flight difference in the coefficients may result in cracking or chipping of the glass substrate unless the faceplate-mounted metal frame is segmented according to the invention; such a discontinuous or segmented faceplate-mounted metal frame is depicted in FIG. 6 wherein the problem is obviated by providing the segmented metal faceplate frame 64. Discontinuous faceplate-mounted metal frame 64 is represented as having a tension foil shadow mask 70 welded to each of the segments, as indicated by the associated weldment symbols 72.

Figure 7:
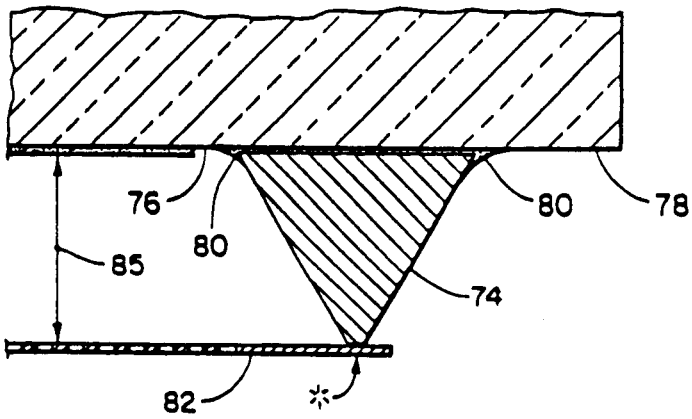
FIGS. 7, 7A and 7B are views in elevation showing in cross-section other embodiments of the metal faceplate frame according to the invention.

The configuration of the faceplate frame, shown diagrammatically in FIG. 3 as comprising a rectangle composed of metal (reference No. 34), may according to the invention, have other forms, embodiments of which are shown in cross-section by FIGS. 7, 7A 7B and 8; these forms may also have slurry-passing apertures. As depicted by FIG. 7, a faceplate frame 74 according to the invention may have the configuration of an inverted "V". The frame 74 is depicted as being secured to the inner surface 76 of faceplate 78 by fillets 80 of cement, which may comprise a devitrifying glass frit. As previously described, the faceplate-mounted metal frame 74 supports a tension foil shadow mask 82 a predetermined Q-distance 85 from the inner surface 76 of faceplate 78. The mask 82 is indicated by the weld symbol as being welded on faceplate-mounted metal frame 74.

Figure 7A:
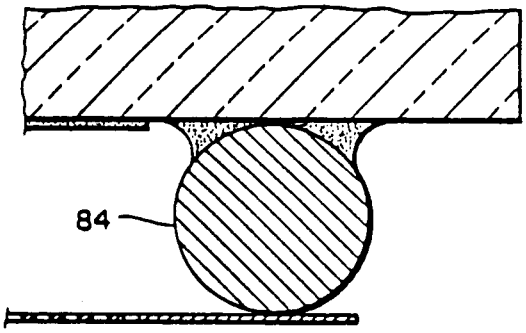
Figure 7B:
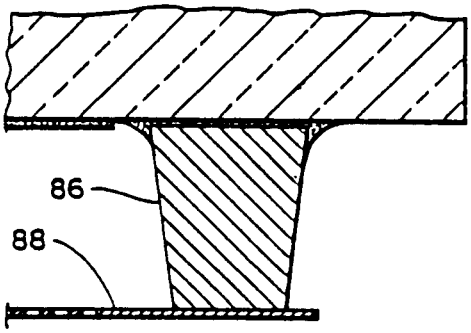

The faceplate-mounted metal frame according to the invention may also take the form shown by FIG. 7A wherein frame 84 is indicated in cross-section as being a rod of solid metal, with securement to the inner surface of the faceplate indicated as being by means of fillets of cement. In the embodiment shown by FIG. 7B, a faceplate-mounted metal frame 86 is shown in cross-section as being in the form of a pyramid, with the sides of the pyramid tapering toward the shadow mask 88.

Figure 8:
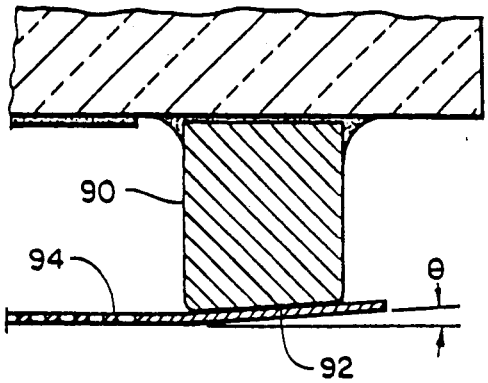
FIG. 8 is a cross-sectional view in elevation showing in detail an aspect of an embodiment of the faceplate-mounted metal frame according to the invention.

Another configurative aspect of the faceplate-mounted metal frame 34 depicted in FIG. 3, represented as being a rectangle, is indicated by FIG. 8, wherein a rectangular faceplate-mounted metal frame 90 according to the invention is depicted as having a shadow-mask-receiving surface 92 shown as being at an angle $\theta$ with respect to the plane of the mask 94.

The configurations depicted can be manufactured by several means. For example, the structures can be fabricated by roll-forming, which is a continuous high-production process for shaping metal strips by means of progressive forming rolls—a method notable for accuracy in formation and production economies. Another feasible manufacturing technique is cold-extruding, also known as impact extruding or cold forging, a technique which provides for close tolerances and excellent surface finishes. Casting and powder metallurgy are other feasible fabrication techniques.

The preferred method of installing the mask is to stretch a pre-apertured shadow mask blank across the metal faceplate frame according to the invention by suitable tensioning means. The mask is stretched across the faceplate-mounted metal frame and is secured to the frame by welding. The welding process may be electrically resitance welding or laser welding. In a 14-inch tube for example, more than 1000 such welds at intervals of about 0.040 inch are required around the circumference of the frame to ensure positive securement of the mask, Also, and has been noted, it is preferred that the mask-support frame interface be flat to ensure positive all-around welded contact between the mask and the supporting structure. The flat surface may be created by lapping; that is, rubbing the surface of the faceplate-mounted metal frame (when mounted on the faceplate) against a flat surface having an abrasive thereon.

With regard to the ball means which form an intercessory part of the indexing elements when paired, the balls are preferably formed from a composition that has a thermal coefficient of expansion compatible with the glass of the tube envelope; such compatibility is required as the balls are ultimately sealed between the sealing areas of the faceplate and the funnel at a relatively high temperature. The balls must have a diameter that provides the precise Q-spacing between the shadow mask and target area. The balls preferably have a sphericity tolerance of $\pm 0.000050$ inch. The balls are preferably formed of a ceramic such as forsterite, and finish-ground by means well-known in the art. The grooves are formed by an ultrasonic tool having the desired cavity shape, and which is vibrated ultrasonically in the presence of an abrasive slurry.

With regard to the composition of the separate metal faceplate frame, alloy No. 27 supplied by Carpenter Technology, Inc. of Reading, Pa. is preferred. The coefficient of thermal expansion of this alloy is considered to be compatible with the glass of the faceplate.

Means other than the internal ball-and-groove elements shown and described may be used for indexing the faceplate, the mask-tensioning structure, and the funnel. For example, the indexing means may be attached externally, such as the means described and claimed in referent copending applications Ser. Nos. 538,003 and 758,174, of common ownership herewith.

While particular embodiments of the invention have been shown and described, it will be readily apparent to those skilled in the art that changes and modifications may be made in the inventive means and method without departing from the invention in its broader aspects, and therefore, the aim of the appended claims is to cover all such changes and modifications as fall within the true spirit and scope of the invention.

What is claimed is:

1. A front assembly for a cathode ray tube including a substantially flat faceplate having on its inner surface a centrally disposed phosphor target surrounded by a peripheral sealing area adapted to mate with a funnel, and a stiff faceplate-mounted support structure composed of a weldable metal and secured to said inner surface between said sealing area and said target for supporting a welded-on high-tension foil shadow mask at a predetermined distance from said inner surface of said faceplate, said mask having a central apertured area and a peripheral area which is welded to said support structure, the bond between said support structure and said faceplate being of such area and strength as to resist substantially all of the tensile forces exerted by said foil mask.

2. A front assembly for a cathode ray tube including a substantially flat faceplate on its inner surface a centrally disposed phosphor target surrounded by a peripheral sealing area adapted to mate with a funnel, and a separate stiff faceplate-mounted support structure composed of a weldable metal secured to said inner surface between said sealing area and said target for supporting a welded-on high-tension foil shadow mask stretched in all directions in the plane of said mask a predetermined distance from said inner surface of said faceplate, said mask having a central apertured area and a peripheral area which is welded to said support structure, the bond between said support structure and said faceplate being of such area and strength as to resist substantially all of the tensile forces exerted by said foil

3. A front assembly for a cathode ray tube including a substantially flat faceplate having on its inner surface a centrally disposed phosphor target surrounded by a sealing area having three substantially radially oriented V-shaped grooves therein for indexing said faceplate in conjunction with complementary rounded indexing means on a mating envelope member, said front assembly further including a separate stiff faceplate-mounted support structure composed of a weldable metal secured to said inner surface between said sealing area and said target for supporting a welded-on high-tension foil shadow mask stretched in all directions in the plane of said mask a predetermined distance from said inner surface of said faceplate, said mask having a central apertured area and a peripheral area which is welded to said support structure, the bond between said support structure and said faceplate being of such area and strength as to resist substantially all of the tensile forces exerted by said foil mask.

4. A front assembly for a color cathode ray tube including a substantially flat faceplate having on its inner surface a centrally disposed phosphor target area surrounded by a sealing area with three substantially radially oriented V-shaped grooves therein for indexing said faceplate in conjunction with complementary rounded indexing means associated with a funnel, said front assembly further including a separate discontinuous or segmented faceplate support structure composed of a weldable metal secured to said inner surface between said sealing area and said target for supporting a welded-on high-tension foil shadow mask a predetermined distance from said inner surface of said faceplate, said mask having a central apertured area and a peripheral area which is welded to said support structure, the bond between said support structure and said faceplate being of such area and strength as to resist substantially all of the tensile forces exerted by said foil mask.

5. A front assembly for use in a color cathode ray tube, including a faceplate having on its inner surface a centrally disposed screen-receiving area for receiving a uniform coating of phosphor slurry by the radial flow suffusion process, said front assembly including a separate metal faceplate frame enclosing said screen-receiving area and secured to said inner surface of said faceplate for supporting a welded-on tension foil shadow mask, said faceplate frame having a plurality of slurry-passing structures contiguous to said inner surface for passing any surplusage of slurry during the slurry-deposition process.

6. A front assembly for use in a color cathode ray tube, including a faceplate having on its inner surface a centrally disposed screen-receiving area for receiving a uniform coating of phosphor slurry by the radial flow suffusion process, and a separate metal frame enclosing said screen-receiving area and secured to said inner surface of said faceplate for supporting a welded-on tension foil shadow mask, said separate faceplate-mounted metal frame having a plurality of slurry-passing structures contiguous to said inner surface for passing any surplusage of slurry during the slurry-deposition process, said slurry-passing structures comprising columns affixed to said inner surface and having openings therebetween, said columns having a cross-section effective to promote radial flow of said slurry with minimum washback.

7. The apparatus defined by [claims] *claim* 1, 3 [and] *or* 5 wherein said frame is of triangular configuration.

8. The apparatus defined by [claims] *claim* 1, 3 [and] *or* 5 wherein said frame is substantially rectangular in cross-section.

9. The apparatus defined by [claims] *claim* 1, 3 [and] *or* 5 wherein said frame is substantially trapezoidal in cross-section.

*10. In a color cathode ray tube, a front assembly including a faceplate having on its inner surface a centrally disposed phosphor target, on each of opposed sides of which and secured to said inner surface are mask support means which is segmented at its interface with said inner surface.*

*11. The front assembly according to claim 10 wherein said mask support means are each composed of discrete, independent segments, one side of each of which is cemented to said inner surface and the opposite side of which supports a portion of a tension shadow mask.*

*12. The front assembly according to claim 10 wherein said segments have rounded ends.*

*13. The front assembly according to claim 10 wherein said segments are composed of metal.*

*14. The front assembly according to claim 10 wherein said segments are attached to said inner surface by devitrifying glass frit.*

*15. The front assembly according to claim 10 wherein each of said mask support means is segmented at its inter-*

*face with said inner surface, but unsegmented at a distance from said interface.*

*16. The front assembly according to claim 15 wherein the segments of said mask support means are attached to said inner surface by devitrifying glass frit.*

*17. The front assembly according to claim 15 wherein said mask is attached to the unsegmented part of said mask support means.*

*18. The front assembly according to claim 15 wherein said mask support means are composed of metal.*

*19. In a color cathode ray tube, a front assembly including a faceplate having on its inner surface a centrally disposed phosphor target enclosed by mask support means along each side of said target, each being composed of discrete, independent segments of metal attached to said inner surface by devitrifying glass frit, said segments supporting a tension foil shadow mask.*

*20. In a color cathode ray tube, a front assembly including a faceplate having on its inner surface a centrally disposed phosphor target enclosed by mask support means along each side, each of which is segmented at its interface with said inner surface, said mask support means each presenting at a distance from said interface a metal surface suitable for welding a tension foil shadow mask, said mask support means each being cemented at the segmented interface to said inner surface of said faceplate.*

*21. In a color cathode ray tube, a front assembly including a faceplate having on its inner surface a centrally disposed phosphor target, on each of opposed sides of which are mask support means supporting a tension foil shadow mask, a portion of each of said mask support means which interfaces with said faceplate inner surface being composed of segments having rounded ends.*

*22. A front assembly for use in a color cathode ray tube, said assembly including a faceplate having on its inner surface a centrally disposed phosphor target, on each of opposed sides of which are a plurality of mask support means expanding in cross-section away from said inner surface for supporting a tension foil shadow mask.*

*23. A front assembly for use in a color cathode ray tube, said assembly including a glass faceplate having on its inner surface a centrally disposed phosphor target, on each of opposed sides of which and secured to said inner surface are mask support means supporting a tension foil shadow mask, said mask support means having a different coefficient of thermal expansion than said faceplate, said mask support means being segmented in its area of interface with said glass faceplate to reduce chipping or cracking of said faceplate due to differences in coefficients of thermal expansion of said mask support means means and said faceplate.*

*24. A front assembly for use in a color cathode ray tube, said assembly including a faceplate composed of glass having a predetermined coefficient of thermal expansion, and having on its inner surface a centrally disposed phosphor target enclosed by a mask support means composed of metal having a coefficient of thermal expansion different from that of said glass faceplate, said mask support means being attached to said faceplate inner surface and supporting a tension foil shadow mask, said mask support means along each side of said target being segmented in its area of interface with said glass and thereby effective to obviate the problem of said difference in coefficients of thermal expansion of said glass and said metal.*

*25. In a color cathode ray tube, a front assembly including a faceplate having on its inner surface a centrally disposed phosphor target, on each of opposed sides of which and secured to said inner surface are mask support means, a portion of each of which mask support means which interfaces with said faceplate inner surface being composed of segments.*

*26. In a color cathode ray tube, a front assembly including a faceplate having on its inner surface a centrally disposed phosphor target, on each of opposed sides of which and secured to said inner surface are mask support means in the form of a plurality of discrete, independent segments.*

* * * * *